United States Patent [19]

Speaker

[11] E Patent Number: Re. 33,273

[45] Reissued Date of Patent: Jul. 24, 1990

[54] MATERIALS HAVING IMPROVED NONFOULING CHARACTERISTICS AND METHOD OF MAKING SAME

[75] Inventor: Lois M. Speaker, Atlanta, Ga.

[73] Assignee: Georgia Tech Research Corporation, Atlanta, Ga.

[21] Appl. No.: 120,599

[22] Filed: Nov. 13, 1987

Related U.S. Patent Documents

Reissue of:

[64] Patent No.: 4,554,076
Issued: Nov. 19, 1985
Appl. No.: 409,097
Filed: Aug. 18, 1982

[51] Int. Cl.[5] ..... B01D 31/00

[52] U.S. Cl. ..... 210/639; 210/500.33; 210/500.27

[58] Field of Search ..... 210/639, 500.2; 424/85, 424/178; 427/369, 370

[56] References Cited

U.S. PATENT DOCUMENTS

| | | | |
|---|---|---|---|
| 2,961,417 | 11/1960 | Small | 210/500 M |
| 3,246,767 | 4/1966 | Pall et al. | 210/505 |
| 3,522,335 | 7/1970 | Rowley | 264/49 |
| 3,576,912 | 4/1971 | Winkler | 260/880 |
| 3,721,623 | 3/1973 | Stana | 210/639 |
| 3,772,072 | 11/1973 | Brown et al. | 117/144 |
| 3,784,399 | 1/1974 | Grot | 117/62.1 |
| 3,789,993 | 2/1974 | Brown et al. | 210/500 |
| 3,892,665 | 7/1975 | Steigelmann et al. | 210/500.2 X |
| 4,012,324 | 3/1977 | Gregor | 210/500 M |
| 4,035,457 | 7/1977 | Kesting | 264/41 |
| 4,160,726 | 7/1979 | Del Pico | 210/639 X |
| 4,161,447 | 7/1979 | Kojima | 210/639 |
| 4,203,847 | 5/1980 | Grandine | 210/500.2 X |
| 4,250,029 | 2/1981 | Kiser et al. | 210/652 |
| 4,399,077 | 8/1983 | Vanlerberghe et al. | 424/47 X |

FOREIGN PATENT DOCUMENTS

| | | | |
|---|---|---|---|
| 1050733 | 2/1959 | Fed. Rep. of Germany | 210/500 M |

OTHER PUBLICATIONS

G. D. Rose et al., "Composite Membranes: The Permeation of Gases Through Deposited Monolayers", Science, 159, 636–637, (1968).

G. D. Rose et al., "Gas Transport Through Supported Langmuir-Blodgett Multilayers", J. Colloid & Interface Science, 27(2), pp. 193–207.

R. A. Wallace et al., "The Electret Effect in Cellulose Acetate Reverse Osmosis Membranes", Polym. Eng. & Sci., 14, p. 92, (1974).

T. Fort, Jr. et al., "Desalination Membranes Foam Built-Up Multilayer Films", Apr. 1974, PB-232 364, NTIS.

T. Sata et al., "Modification of Properties of Ion Exchange Membranes etc.", J. Polymer Sci./Polym. Chem. Ed., 17, pp. 1199–1213, (1979).

*Primary Examiner*—Frank Spear
*Attorney, Agent, or Firm*—Oldham & Oldham Co.

[57] ABSTRACT

A method of improving the separatory properties of membranes by the deposition of a fluorinated amphiphilic compound in an oriented Langmuir-Blodgett layer on the membranes surface so as to increase membrane selectivity and counteract membrane surface properties leading to fouling during liquid-liquid separations and enhance gas selectivities of membranes used for gas-gas separations. The use of a fluorinated long-chain pyridinium bromide is specifically disclosed.

32 Claims, 6 Drawing Sheets

*Blodgett "y-layers."*

MATERIALS HAVING IMPROVED NONFOULING CHARACTERISTICS AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to liquid purification or separation and, more particularly, to the deposition of oriented monolayers on the surface of separation membranes.

2. Description of the Prior Art

The cost and energy effectiveness of membrane separation processes are seriously compromised by the readiness with which available membranes undergo fouling by colloidal materials. The anion-exchange membranes of electrodialysis (ED) stacks and the incharged membranes of reverse-osmosis (RO) systems are especially prone to fouling.

The heart of every modern electrodialytic treatment system is an alternating array of polymer-based ion-exchange membranes. A serious obstacle to cost-effective operation of electrolytic desalination plants is the ease with which these membranes undergo concentration polarization and fouling by humic acids. These end products of biodegradation are present in most natural waters as colloidal materials bearing partially ionized acid groups. Their negative character renders them much more likely to adhere to a positively charged anion-exchange membrane than to a cation-exchange membrane, and this adherence has two deleterious effects: first, the pores of the membrane become physically occluded by colloidal material; and second, the positive bulk with a negative fouled surface functions as a bipolar "sandwich membrane", greatly enhancing its tendency to undergo further fouling.

During continuous operation, these insoluble impurities occlude the membrane surfaces at an increasing rate, and the electrical resistance of a stack is raised to the point where power costs make further operation uneconomic. The stack must then be disassembled for stringent cleaning or replacement of membranes. The combined expenses of down-time, replacement, or cleaning, and power requirements that rise steadily during operation seriously compromise the cost effectiveness of this method of water purification.

Fouling of RO membranes proceeds by a less well known, but related pattern, in which colloidal materials are occluded on the working surfaces of the membranes almost immediately after operation has been initiated. In RO separations, greatly reduced membrane flux is the negative economic factor.

Considerable evidence indicates that a propensity toward polarization and fouling is governed by the nature of a membrane surface. Critical surface characteristics have been shown to include rugosity (roughness), chemical homogeneity, and hydrophilicity. Their demonstrated importance indicates that surface modification may offer a fruitful avenue to a mechanistic definition of concentration polarization and fouling, and to their mitigation.

SUMMARY OF THE INVENTION

A membrane surface is modified by coating with individually oriented layers of amphiphilic molecules, i.e., molecules with one polar or hydrophilic end and one non-polar or hydrophobic end, using the classical Blodgett dipping technique. Because the layers are extremely thin (around 20 Å), they can modify the surface characteristics of a semipermeable selective membrane which lead to fouling without affecting its bulk properties, i.e., the separatory action of the membrane. Membrane surface so treated are physically smooth (the deposited layers having strong lateral cohesive forces), chemically homogeneous and hydrophobic. The treatment is to be carried out after manufacture of the membrane under nonfouling conditions and before its exposure to fouling conditions.

The types of amphiphilic molecules which are best utilized in the present invention include fluorinated compounds (bearing a polar group at the end of the chain opposite to the fluorinated group). A fluorinated long-chain pyridinium bromide, hereafter referred to as $R_f$PyrBr, was tested extensively as a modifier of the surfaces of anion-exchange membranes and found to be very effective in preventing fouling. For maximum benefit, the compounds must be applied to surfaces as Langmuir-Blodgett layers so that the resulting layer is monomolecular, free of defects and strictly oriented with, in the case of fluorinated amphiphilic compounds, the fluorinated ends facing the feed solution.

Fluorinated polymerizable materials that can be deposited in the monomer form and polymerized on the surface in such a manner that the orientation of the molecules is retained may be even more effective, in that the lifetime of the coating may be increased by entanglement with the original surfaces.

Most non-fluorinated amphiphilic compounds will not be useful in the invention. The determining factors for prevention of fouling are that the compound must exhibit either a neutral charge or a charge identical to that of the membrane, and that it must be fluorinated. Presumably, identical charge and the greatest possible extent of fluorination compatible with the Blodgett transfer technique are most desirable. The only criterion for matching membranes with fouling-preventive (fluorinated) amphiphilic compounds is the avoidance of opposing charges.

Many amphiphilic molecules, nonfluorinated and with charges opposite to that of the membrane, will lead to greatly enhanced fouling, as is demonstrated by the experiments set forth herein with arachidic acid coated membranes. This effect is also consistent with the current understanding of fouling, which is said to be irreversibly initiated by the very first molecular layer of oppositely charged surface-active material that contacts the membrane.

Molecular weight of the amphiphilic compound is of great significance in that it governs, to a large extent, the surface-active character of the compounds to be used. Molecular weight should probably range between 350 and 700 for fluorinated compounds, depending on the nature of the polar group and the atomic weight of a counterion, if there is one. The compounds must be virtually insoluble when delivered to a water surface (by the standard Blodgett technique) as a very dilute solution in a water-immiscible low-boiling solvent. To some extent, slight solubility can be compensated for by lowering the deposition temperature, as was done for $R_f$PyrBr.

In summary, the amphiphilic compounds that are useful in the present invention are fluorinated, surface-active, neutral or charged like membrane and sufficiently water-insoluble at the temperature and pressure of transfer to be amenable to deposition as Langmuir-Blodgett layers.

The deposition of $R_f$PyrBr was carried out at the lowest temperature reading obtainable under the laboratory conditions, 10.5° C. It is probable that a still lower temperature would further decrease the water solubility of $R_f$PyrBr, which is desirable. Therefore, a range of 1° C. to 10° C. is recommended.

Deposition pressures of 30 mN $M^{-1}$ and 35 mN $M^{-1}$ were satisfactory for $R_f$PyrBr, whereas 25 mN $M^{-1}$ led to lower surface density of the transferred compound and 40 mN $M^{-1}$ apparently produced crowding and disorientation of some molecules. Therefore, a pressure range of 30–35 mN $M^{-1}$ is recommended.

The experimental data demonstrate that a single monomolecular layer, which is approximately 20 Å thick, is most effective in preventing fouling. Multiple layering, which would lead to greater materials costs and much higher processing costs, is also undersirable from the standpoint of ultimate performance.

A dipping speed of 0.1 cm/sec for deposition of $R_f$PyrBr was utilized. This speed was determined by observation of the meniscus, which is horizontal and smooth at appropriate transfer rates.

The category of liquid-liquid separation membrane types which can be treated by the present invention includes all those intended for the separation of ions or ionic, colloidal, crystalline, particulate, or vaporizable material from liquids. In addition, the category of membrane types is not limited to polymeric materials and includes membranes designated as electrodialysis, cation-exchange, anion-exchange, bipolar, reverse-osmosis, ultrafiltration, pervaporation, and hemodialysis membranes, but it does not exclude any selective membranes, known by any other designation, intended to carry out a process that can be described as the separation of ions or ionic, colloidal, crystalline, particulate, or vaporizable matter from liquids.

Experimental observations and data obtained during separation processes that employed two types of anion-exchange membranes and two types of reverse-osmosis membranes are set forth. The membranes were treated by deposition of oriented layers of a fluorinated long-chain pyridinium bromide. Also, comparable data are disclosed for control membranes that are identical but untreated.

An alternative embodiment of the concept of the invention, with specific application to separatory membranes, is that oriented deposition of appropriate long-chain amphiphilic compounds can be used to decrease the scaling tendencies of anion- and cation-exchange electrodialysis membranes. An electrodialysis membrane tends during operation to build up regions of high pH at the surface that is not fouled by colloidal materials. As they come in contact with this region, many inorganic cations commonly present in water (calcium, magnesium, etc.) form insoluble materials that precipitate as scale on the membrane surface. Accumulated scale, like layers of foulant, increases the electrical resistance and decreases the flux of the membrane.

Surface modification by deposition of an appropriately oriented monolayer on any membrane face that is prone to scaling should prevent the attachment of materials such as inorganic oxides and hydroxides. Thus, although insoluble compounds may continue to form, they can have no deleterious effect upon the operation of the membrane.

A further embodiment of the present invention is that oriented deposition of appropriate long-chain amphiphilic compounds can be used to enhance the inherent selectivities of several categories of selective membranes. The categories of selective membrane types include selective semipermeable membranes intended for the separation of ions or ionic, colloidal, crystalline, vaporizable or particulate matter from liquids (e.g., salt from brackish water or proteins from cheese whey); and selective semipermeable membranes intended for the separation of one liquid from another liquid (e.g., ethanol and water).

It has been demonstrated, for example, that oriented deposited layers of a nonfluorinated long-chain fatty acid will impart ethanol selectivity to a membrane that is intrinsically water-selective or increase the ethanol selectivity of an ethanol-selective membrane. That confirms the hypothesis of the present invention that deposited oriented layers of an amphiphilic material exhibiting a strong affinity for one component of a mixture will confer selectivity for that component upon a separatory membrane.

The present invention may also be useful for the enhancement of the gas selectivities of gas-gas separation membranes (e.g., separating nitrogen or oxygen from the air). Colloidal fouling does not present difficulties in gas-separation processes, but such processes are not presently cost-effective because of the relatively low selectivities of available membranes.

Appropriate selection of amphiphilic materials may lead to the simultaneous desirable modification of more than one property of a membrane. For example, deposited oriented layers of a selected amphiphilic material might simultaneously heighten the water selectivity and reduce the fouling propensity and scaling tendency of a given membrane.

As another alternative embodiment closely related to the treatment of the surfaces of semipermeable membranes, the use of the present invention mitigates the fouling of anion- and cation-exchange resins, macroreticular resins, zeolites and similar materials intended for the separation of one component from a mixture or solution. This mitigation would be accomplished by deposition of appropriate oriented amphiphilic layers on the surfaces of the resin particles, after their preparation under nonfouling conditions and before their exposure to fouling conditions.

The concept of beneficial surface modification by deposition or oriented amphiphilic layers has several applications that are unrelated to the modification of semipermeable membranes. These include the following: modification of heat-transfer surfaces to promote dropwise condensation and to mitigate fouling, microbial growth, and scaling; modification of the surfaces of liners for solar-energy ponds to mitigate fouling and microbial growth; modification of marine surfaces to mitigate fouling, microbial growth, and inorganic scaling; modification of the surfaces of metals to mitigate their tendencies to corrode when exposed to certain environments; modification of the surfaces of photochemical solar converters to protect them from oxide formation and to enhance their light absorption; modification of metal and polymer surfaces to heighten or reduce either their adhesive characteristics or their lubricities; modification of the surfaces of biomaterials used on prosthetic devices, bioimplants, etc. to minimize biorejection; modification of the surfaces of dialysis membranes to minimize both hemolysis and fouling; and modification of the surfaces of dialysis membranes to increase their selectivities for blood factors found to be associated with renal lesions, rheumatoid arthritis, muscular dystrophy, schizophrenia, and other diseases.

BRIEF DESCRIPTION OF THE FIGURES OF DRAWINGS

FIGS. 1A–C are representative illustrations of the steps leading to the fouling of an anion-exchange membrane;

Figure 11:
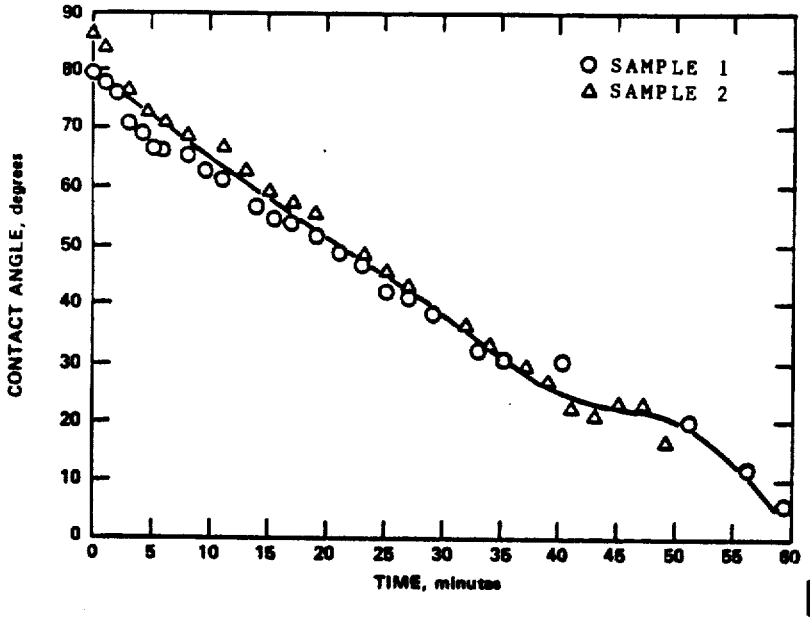
Figure 12:
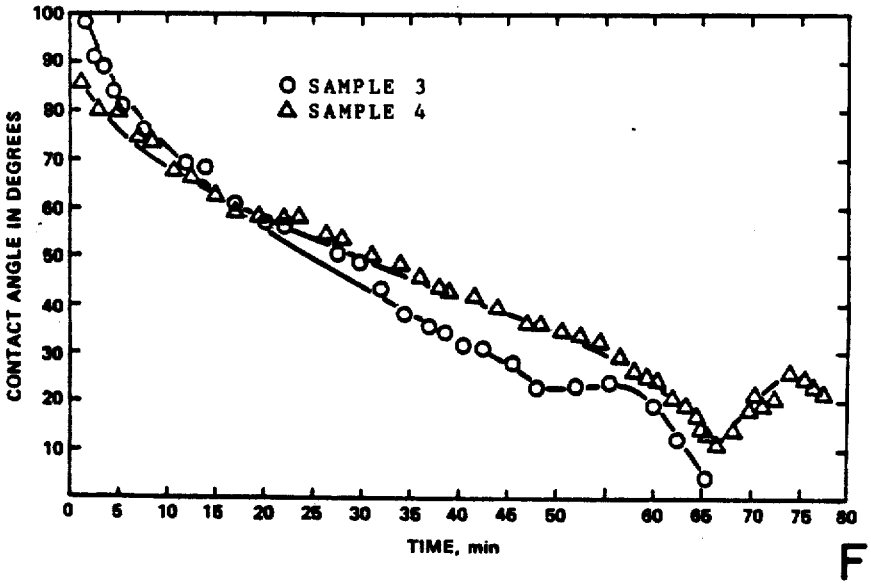
Figure 13:
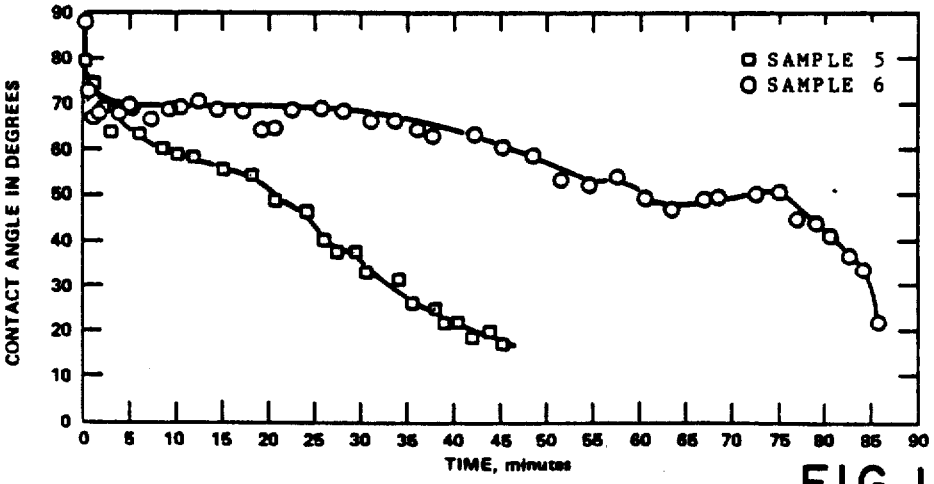

FIGS. 10A–D are schematic representations of contact-angle decay at membrane surfaces;

FIG. 11 is a contact angle-time surve for contact-angle decay on membranes coated with three layers of $R_f$PyrBr at 25° C. and 25 mN $M^{-1}$;

FIG. 12 is a contact angle-time curve for contact-angle decay on three layers of $R_f$PyrBr at 25° C. and 30 mN $M^{-1}$; and FIG. 13 is a contact angle-time curve for contact-angle decay on membranes coated with three layers (Sample 5) and ten layers (Sample 6) of $R_f$PyrBr at 10.5° C. and 40 mN $M^{-1}$.

DETAILED DESCRIPTION OF THE PREFERRED EMBODIMENTS

I. AN ANALYSIS OF CONCENTRATION POLARIZATION AND FOULING

A. Mechanism of Polarization and Fouling

The limiting current ($i_{lim}$) of an electrodialysis stack is generally agreed to be that current density at which the boundary-layer concentration of salt ions approaches zero. Current continues to pass only because water dissociates to form hydrogen and hydroxyl ions, a process that requires a high energy input. As a rule, industrial desalination operations avoid this region of inefficiency by operating at 70% of the limiting current, where the current-voltage relationship is linear.

Some degree of concentration polarization, even at current densities far below the limiting current density, occurs during electrolysis with all types of ion-exchange membranes. Hydrogen and hydroxyl ions resulting from the "splitting" of water are involved in the conduction process, with hydrogen ions accumulating on the depleting surfaces of an ion-exchange membrane while hydroxyl ions are transported through the membrane structure. Organic anions are converted, as they reach the resulting localized region of low pH, to sparingly soluble organic acids, which then deposit on a positively charged anion-exchange membrane. Once this occurs, the bipolar membrane produced gives rise to even faster production of hydrogen ions and the rate of deposition of organic material (i.e., fouling) increases.

A basic separation unit comprises a cation-exchange and an anion-exchange membrane mounted between two electrodes, with electrolyte solution flowing through the enclosed compartments. The flow ensures good mixing in the center of the compartment, but its effect diminishes as the surfaces of the membranes are approached. In the static boundary layers immediately in front of and behind the membranes, ions are transported only by electrolytic transfer and diffusion; in the mixed zone, ion transport is a function of electrolytic transfer, diffusion, and physical mixing.

With the passage of an electrolytic current through the system, anions migrate toward the anode and cations transfer toward the cathode. If the electrolyte is KCl, cations and anions share equally in the passage of current through the solution bulk, and the transference number is 0.50 for both. The membranes, however, are selective; the transference number for potassium is essentially 1.0 in the cation-exchange membrane and 0.0 in the anion-exchange membrane. Similarly, the transference number for chloride ion is 1.0 in the anion-exchange membrane and 0.0 in the cation-exchange membrane. Chloride ions carry only 50% of the electrical current in solution, but 100% of the current through the anion-exchange membrane. These differences in transference numbers between solution and membrane are the source of the depletion and concentration effects that make electrodialysis a valuable separation procedure. The same transference-number differences also lead to difficulties like concentration polarization.

If one faraday of electricity is passed through the above-described electrodialysis cell, 0.5 g eq of chloride will be transferred to or away from the membrane surface, and 1.0 g eq of chloride will be transferred through the membrane. There will be a concentration of chloride ions at the rear surface of the anion-exchange membrane, but a depletion of chloride ions at its front surface. At steady state, chloride ions that are not electrolytically transported to the front surface must be supplied by diffusion through the static boundary layers, and concentration gradients are established. This steady-state condition can be described by Equation 1:

$$\frac{i}{F} t_s^- + D\frac{(C_b - C_l)}{\delta} = \frac{i}{F} t_m^- \quad (1)$$

where:

$i$ = current density, coulomb $sec^{-1}$ $cm^{-2}$ $F$ = faraday, 96,500 coulomb $eq^{-1}$ $t_s^-$ = transference number of anion in solution $D$ = diffusion coefficient of ion $C_b$ = concentration of ion in the bulk $C_l$ = concentration of ion in the boundary layer $\delta$ = thickness of boundary layer $t_m^-$ = transference number of anion in membrane This equation can be rearranged to Equation 2:

$$\frac{i}{F}(t_m^- - t_s^-) = \frac{D(C_b - C_l)}{\delta} \quad (2)$$

which shows that, as current density increases, the boundary-layer anion concentration approaches zero.

Figure 1A:
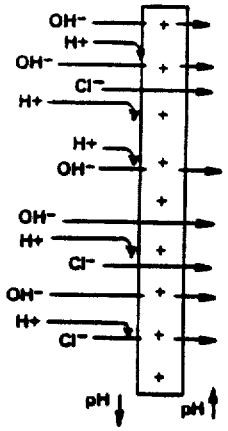

Although some hydroxyl ions are transported through the membrane and some hydrogen ions accumulate at the membrane surface even at very low current densities, the fraction of current carried by hydroxyl ions is insignificant until the limiting-current density is reached. At this point, continued passage of current requires that hydroxyl ions take the place of the no-longer-available anions, and hydroxyl ions can be furnished only by the ionization of water. At higher current densities, therefore, hydrogen and hydroxyl ion concentrations become larger relative to the concentrations of other ions. Hydroxyl ions are transferred through the anion-exchange membrane, leaving an excess of hydrogen ions on its surface (FIG. 1A), which markedly lowers the pH at that surface.

Figure 1B:
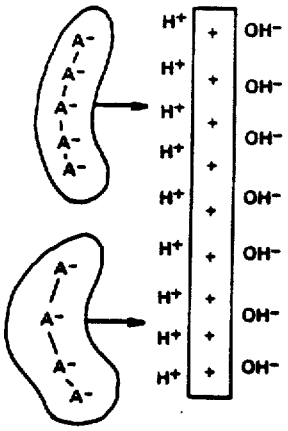
Figure 1C:
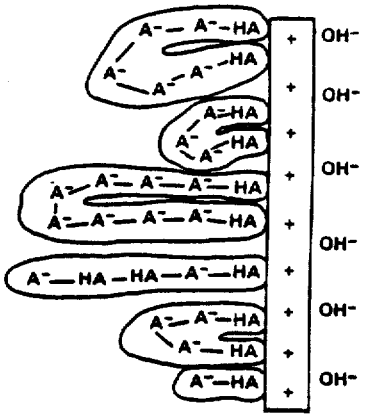

Most naturally occurring organic contaminants bear negative charges, and their acid forms are insoluble. When the supply of hydrogen ions at the depleting surface of an anion-exchange membrane is sufficiently great, colloidal organic substances are partially neutralized (FIG. 1B) and precipitation is initiated (FIG. 1C). The autocatalytic nature of this colloidal fouling, its energetic consequences, and some of the membrane characteristics contributing to it can be summarized as follows:

Whenever current is passed, salt ions are depleted near membrane surfaces because of transference number differences between solutions and membrane, and concentration polarization occurs.

Further passage of current requires the furnishing of hydrogen and hydroxyl ions through the continuous ionization of water.

Hydrogen ions accumulate at the depleting surfaces of anion-exchange membranes whenever concentration polarization causes water molecules to ionize.

Organic anions are driven toward the surfaces of anion-exchange membranes by the electric field.

In the zone in which hydrogen ions accumulate, organic anions are converted to sparingly soluble acids, which deposit on the membrane.

Precipitation of negatively charged material at the surface of a membrane bearing fixed positive charges effectively produces a "bilayer membrane". At the interface of the oppositely charged ion-exchange materials, negative ions migrate through the anion-exchange membrane and positive ions migrate through the negatively charged colloidal layers. The net result is salt depletion in the interfacial region, which further potentiates water ionization, hydrogen ion production, and colloidal precipitation (FIG. 1C).

Once deposition of organic material occurs, the deposited material is tightly held by van der Waals forces and is difficult to completely remove.

The energy required for continuous ionization of the water that diffuses to the interfacial region leads to an increase in the apparent membrane resistance.

The resistance of the interfacial layer of solution also becomes higher as it is depleted of electrolyte, raising the total resistance of the system.

The fouling behaviors of a given membrane type and composition can vary widely between samples; "glossy" surfaces appear to be related to fouling resistance. Grossman, G. and Sonin, A., Office of Saline Water Research and Development Progress Report, 742 (1971).

The degree of microscopic surface homogeneity is important. Membranes containing reinforcing materials, or membranes with micro-heterogeneous surfaces show a greater tendency to foul rapidly. Korngold, E.; de Korosy, F.; Rahav, R.; and Taboch, M., Desalination 8 (1970), 195.

The tendency to foul is the same in electrodialysis stacks containing only anion-exchange membranes as in those comprised of alternating cation-exchange and anion-exchange membranes.

Anion-exchange membranes have much greater fouling propensities than cation-exchange membranes, because most organic contaminants are negatively charged.

These observations cumulatively support the hypothesis that membrane polarization leading to fouling is primarily a surface-controlled phenomenon. Therefore, a means of permanently modifying an operating membrane surface without changing the bulk electrical properties offers the best hope of producing desalination membranes with long operating lifetimes.

B. A Mathematical Model for Fouling

Adopting the physical model of fouling that evolved from the work of Cooke and Korngold, et al., Electrochem. Acta 4 (1960), 1979; and Desalination 8 (1970), 195, Grossman and Sonin derived an expression for the amount of fouling in terms of the resulting reduction in limiting current. Office of Saline Water Research and Development Progress Report 813 (1972); Desalination 10 (1972), 157; Desalination 12 (1973), 107. They concluded that a fouling film with the same charge as the substrate would not affect the limiting current. An oppositely charged, extremely thin film can cause marked limiting-current reduction, the thinness required for effective fouling being an inverse function of the concentration of fixed charge. A neutral film can reduce the limiting current but, to do so, it must be many times thicker than an oppositely charged film.

When a Blodgett layer is deposited on a substrate, its thickness, surface concentration, and charge density are both known and controllable. This fact can provide an excellent basis for detailed experimental testing of the Grossman-Sonin model for membranes fouled by known thicknesses of oppositely charged or neutral molecules.

II. BLODGETT MULTILAYERS

A. The Monolayer Assembly Technique

If a solution of amphiphilic molecules in a hydrocarbon solvent is gently dropped on a water surface, the drops will fan out as the solvent evaporates. Simultaneously, the amphiphilic molecules become oriented into a solid monolayer exactly one molecule thick, with their polar "heads" at the water interface and their non-polar "tails" at the air interface. Langmuir, I., Science 87 (1938), 493. This monolayer lowers the surface tension of the water by an amount equal to its own "surface pressure".

At a given surface pressure, each type of monolayer film occupies a characteristic surface area. If the molecules are pushed together by a moving barrier, regions characterized by different compressibilities appear until the film "collapses", usually at around 20 $Å^2$/molecule for fatty acid monolayers.

If a monomolecular film is in the so-called "condensed" region that corresponds to high surface pressures, it will readily transfer to a solid that is passed vertically through it. Blodgett, K. B., J. Am. Chem. Soc., 57 (1935), 1007. The Blodgett-Kuhn dipping apparatus provides a moveable polyethylene float activated by a suspended weight, so that constant surface pressure and constant molecular area of the spread film enclosed by the barrier are maintained throughout the dipping procedure. As a monolayer of film transfers from the liquid surface to the solid, the floating barrier moves forward so that the area of the spread film decreases by the area of both sides of the dipped solid. The "transfer ratio", i.e., the areal coverage on the solid relative to the areal coverage on the water is virtually unity for each layer, and orientation is conserved during transfer.

Figure 2:
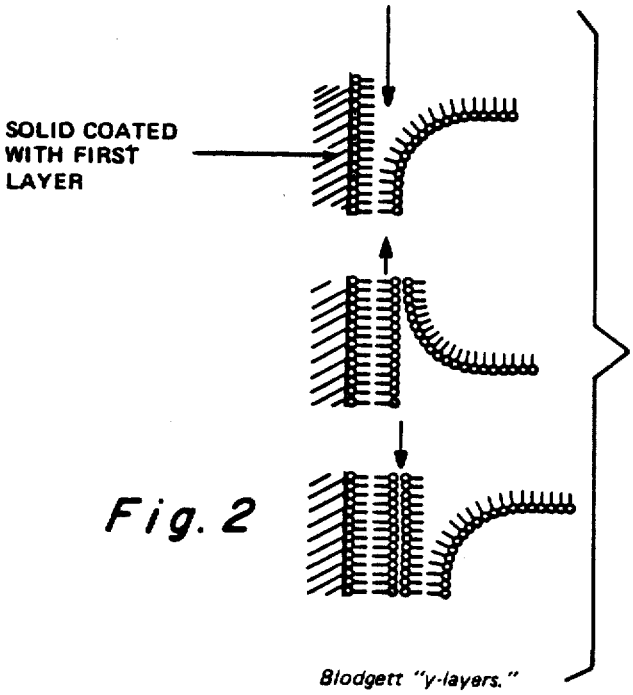
FIG. 2 is a series of schematic diagrams of the deposition of Blodgett "y-layers"
Figure 3:
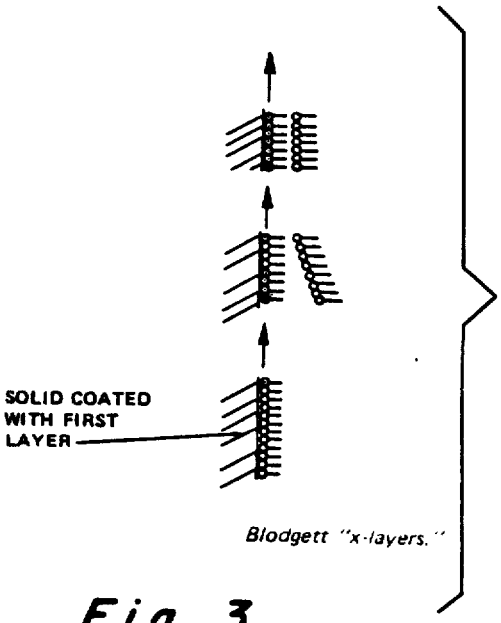
FIG. 3 is series of schematic diagrams of the deposition of Blodgett "x-layers"

Repetitive dipping of the solid to be treated results in the pickup of successive monolayers, oriented in a y (head-head, tail-tail) (FIG. 2) or an x (head-tail, head-tail) (FIG. 3) pattern. This technique results in multilayers of molecules oriented perpendicular to the surface on which they are deposited. The number of deposited layers is found by actual counting of the number of forward movements of the barrier during successive dips. Layering patterns, as well as the total number of layers that can be deposited, are dictated by the chemical and steric nature of the amphiphilic molecules. After a given number of layers has been attached, an assembly becomes "autophobic", rejecting the addition of more layers of any substance, including itself.

Whether or not a substance will transfer as a multilayer to a solid substrate depends on several factors, including the attraction of the molecules for the water surface, the cohesive attraction between the molecules and the attraction of the molecules to the solid substrate.

B. The Properties of Monolayer Assemblies

Monolayers attached in the proposed manner have unique properties for two reasons: each layer is reproducibly one molecule thick; and the polar-nonpolar portions of the molecules in each layer are strictly oriented with regard to the substrate. These features are found in the membranes of biological cells and are believed to be critical to natural phenomena like activated transport.

Oriented monolayers adhere to their substrates with extraordinary strength. In the case of a stearate film on ordinary glass, for example, penetration of the carboxylate groups of the fatty acid salt into the glass surface is so extensive that the salt can be removed only by sandblasting, which, of course, also destroys the involved region of the substrate. Some substances can form monolayer assemblies up to 4,000 layers thick and many of these assemblies, also called Blodgett multilayers, are indefinitely stable. For example, the nonreflecting glass used in optical equipment is prepared by monolayer deposition techniques.

Although assembled monolayers are stable, they are also "penetrable", a term suggested by Sobotka to emphasize that passage through multilayers is possible because they are in continuous thermal motion. J. Colloid Sci. 11 (1956), 435.

The application of monolayers to the surfaces of membranes should have little influence on their ion-exchange properties, even if the monolayers are charged. This is true because of the exceedingly small number of charged groups in even a completely ionized monolayer. The van der Waals' forces responsible for hydrophilicity decay with the sixth power of the distance and therefore operate over an exceedingly small range, whereas ion-exchange depends on electrostatic forces, which decreases only with the square of the distance. Thus, deposited multilayers will probably allow sufficiently close approach of ions so that they can be attracted to the fixed charge groups on the membrane.

1. The alteration of surface hydrophilicity by attachment of monolayer assemblies Langmuir was the first to observe that a metal surface coated by stearate multilayers became non-wettable by water and also by many hydrocarbons. J. Franklin Inst. 218 (1934), 143. The coated surface had become both hydrophobic and oleophobic. Orientation of the attached multilayers had apparently produced a smooth surface consisting of closely packed and strictly aligned methyl groups, i.e., a very "low-energy" surface. Wettability of a solid is thus dependent only upon its outermost atomic layers. Shafrin, E. G. and Zisman, W. A., J. Phys. Chem. 64 (1960), 519. In general, factors that increase the polarity of a surface, including unsaturation of hydrocarbon groups, increase wettability. Hydrogenation decreases wettability, and fluorination has a still more marked effect.

Zisman found that surfaces coated by multilayers of perfluorolauric acid exhibited the lowest surface energy of any surface yet prepared. Shulman, F. and Zisman, W. A., J. Colloid Sci. 7 (1952), 465. These surfaces are both hydrophobic and oleophobic, repelling even alkanes with great efficiency.

The implications are that an appropriate multilayer coating will eliminate the water wettability of a membrane surface by increasing its hydrophobicity, and it will simultaneously reduce adhesive attractions between the membrane surface and organic materials in the raw waters by increasing the surface oleophobicity.

2. Reduction of surface heterogeneity by deposited multilayers

Figure 4:
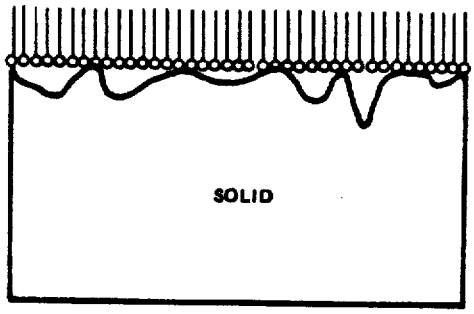
FIG. 4 is a schematic diagram of the manner in which a close-packed monolayer may bridge over surface roughness as it is deposited on a solid.

It has been found that crevices and pores in a surface give rise to variabilities in wetting and de-wetting behavior, implying that the wettabilities of rough surfaces and smooth surfaces are very different. Bikerman demonstrated the integrity of deposited multilayer films by attaching films of barium stearate to wire gauze with apertures about 0.53-mm across. Proc. Roy. Soc. A. 170 (1939), 130. The transfer ratio based on the gross area of the gauze was nearly unity, exactly the same as it would have been if the object coated had been a solid without holes or subdivisions. Thus, the oriented layers attached themselves to the gauze at the available points and possessed sufficient lateral cohesiveness to bridge the relatively large intervening gaps as long as they were kept wet. They thereby conferred a homogeneous character upon a highly heterogeneous surface. (See FIG. 4).

Day and Ringsdorf have carried out experiments in which diacetylene monocarbonic acids were polymerized at a water surface and transferred as bilayers to porous substrates. J. Polym. Sci. Polym. Lett. 16 (1978), 205. These coatings were 60-Å thick and could be made to bridge pores up to 0.5 mm in diameter on the solid substrates. These experiments demonstrate that deposited multilayers can lend a homogeneous character even to solids with gross heterogeneities. The effect of successive monolayers upo the fouling propensities of a desalination membrane with a roughened surface should give a ready evaluation of the importance of roughness and heterogeneity.

3. Conditioning of Langmuir-Blodgett multilayers

The properties of deposited monolayer assemblies can be altered to fit specific needs. For instance, a hydrophobic film can be rendered hydrophilic by post-treatment with dilute solutions of polyvalent cations like thorium nitrate. If the assemblies are mixtures, either of a monomer and its polymers, or of an acid and its salt, one component can be removed by a suitable solvent, leaving a "skeletonized" film of regular structure. The degree of polymerization, or the initial relative concentrations of soap and acid, provide methods of controlling the final coverage on the substrate.

The "depth" of coverage at the membrane surface can be controlled through the number of monolayers applied. The percentage of surface that is covered to this depth can be determined by the proportions of, for example, polymerizable and nonpolymerizable monomers in the deposited layers. Fort et al. showed that post-polymerization at the surface, followed by solvent leaching, effectively removed ethyl stearate from polyvinyl stearate. J. Coll. Interface Sci. 47 (1974), 705. The attachment of polyvinyl stearate to the membrane and the structural integrity of the polymer remained unchanged. The apertures of these skeletonized films can be "refilled" by water or hydrocarbons. Sobotka, H., Proceedings of the Conference on Biochemical Problems of Lipids, Butterworths, London, 1956, p. 108.

4. Gas permeation through membranes modified by monolayer deposition

Two types of membrane modifications by monolayer deposition have been carried out by Quinn. Science 159 (1968), 636; J. Coll. Interf. Sci. 27 (1968), 193; and Biophys. J. 12 (1972), 990. In one, several gas-permeable membranes were coated with assembled monolayers, and the effects on the permeation rates of different gases were evaluated as functions of the nature and number of the multilayers. Permeabilities of the substrate polymers were markedly decreased by attachment of stearic acid or 3$\beta$-cholestanol, but the effect of oleic acid was much smaller. Presumably, steric influences on the packing of the multilayers can explain these differences. These workers also studied the effect of pore sizes on gas permeation rates, modifying the reproducibly-sized pores of track-etched mica membranes by depositing stearate multilayers. As the layers dried, they migrated into the pores by surface diffusion. Pore radii determined by Knudsen gas flow showed excellent correlation with the modified radii predicted from the number of deposited multilayers.

5. Blodgett deposition on reverse-osmosis membranes

Langmuir-Blodgett layers have been deposited and polymerized on porous polysulfone backing materials to produce asymmetric reverse-osmosis membranes. Fort, T., Jr. and Lando, J., Office of Saline Water Research and Development Progress Report, 74–944 (1974). High salt-rejection samples could be prepared with coatings comprising 18 layers of cellulose acetate, but many technical difficulties were encountered during the deposition procedures, and cracks leading to leakage through the multilayers were frequent.

Such defects would be less deleterious to the successful utilization of this invention than to the process described by Fort and Lando. Amphiphilic molecule deposition was designed in this invention to moderate the polarization and occlusion tendencies of working membranes, whereas the amphiphilic molecule layers that they deposited on porous supports were intended to become the working parts of reverse-osmosis membranes. Any defects thus led to losses of basic function, while defects in the coatings of the present invention would lead only to a lower percentage of modification of undesirable properties. As discussed infra, Langmuir-Blodgett layers may also be used to enhance the fouling resistance of standard reverse-osmosis membranes.

6. "Electrets" as fouling preventives in reverse-osmosis experiments

Wallace and Gable compared fouling behavior of unmodified cellulose acetate reverse osmosis membranes with that of identical membranes that had been made into "electrets", Polym. Eng. and Sci. 14, (1974), 92. These are essentially solid-phase condensers, with negative charges aligned along the "skinned" surface, and are electroformed by charging in a five-layer capacitor. Low-humidity measurements of the net surface charge showed a rapid decay rate during the first 24 hours, after which detectable charge persisted for more than 70 days, the total span of observation. Immersion in distilled water after 20 days brought about extremely rapid charge dissipation.

When electret membranes were used in reverse osmosis systems, both the amount and the adherence of foulant deposits were reduced. In addition to repelling colloidal tannic acid, the electrets absorbed less colloidal iron oxide. Salt rejection was unchanged.

No data were given on decay behavior of in-service electret membranes or on the length of time between the "electroforming" and initiation of the reverse osmosis testing described. It is logical to assume that electrets would decay rapidly in water that contains ions, since randomization of the aligned polar portions of the cellulose acetate will be encouraged by a randomly charged environment and by water permeation. However, it is apparent that the presence of negative charge on the electret surface minimized difficulties with fouling, even though this charge was weak and shortlived.

Deposition of assembled monolayers to form a sheath may produce the same protective effect as "electret" production, with the additional advantage of long-term stability.

7. Electrodeposited polyelectrolytes on cation-exchange membranes

Sata and Mizutani have reported treatments of commercial cation-exchange membranes by surface coatings of various cationic polyelectrolytes. J. Polym. Sci. Polym. Chem. Ed. 17 (1979), 1199. The polyelectrolytes were applied either by electrodeposition or by adsorption from solution, and would therefore not exhibit the strict molecular orientation and layering behavior of Blodgett layers. However, the properties of electrodeposited layers may approach those of monolayer assemblies, thus indicating the direction and degree of modification that can be expected. The coatings affected current efficiencies, electrical resistances and selectivities between univalent and divalent cations.

In all cases, the electrodeposited layers produced greater changes in membrane properties, and were more compact and thicker than adsorbed layers. The electrodeposited layers effectively prevented fouling by ionic surface-active agents, so that the membrane resistance remained constant during electrodialysis of solutions of these agents.

Monolayer assembling should confer the same tenacity of attachment that electrodeposition did in Sata's work, with the added benefits of molecular orientation and the ability to use minimal, precisely controlled, coating thicknesses. The anti-fouling effect should be the same in a desalination environment as in a polyelectrolyte dialysis system.

III. SPECIAL APPARATUS

A. The Wilhemy Balance for Surface Pressure-Area Measurements

An apparatus was constructed for measuring the surface pressure ($\pi$) of an oriented monomolecular film on water as a function of available molecular area (A). The Wilhemy balance comprises a shallow film trough of solid Teflon on a heavy aluminum base equipped with leveling feet. A stainless-steel rod, piercing a gasket at one end of the enclosing Lucite box, controls molecular area by manipulation of a spring-loaded Teflon barrier straddling the trough. Two-dimensional pressure changes are calculated from differences in the apparent weight of a 3-cm square of Schleicher and Schüll No. 589 filter paper. This piece of paper (a "Wilhemy plate", chosen because it is completely wetted and no contact-angle correction need be included in calculations) hangs by a silver chain from the beam arm of a modified Troemner Model 5100 specific-gravity balance. The observed surface pressure, $\pi$, is equivalent to the change in surface tension due to the monolayer film and is found from Equation 3:

$$\pi = \frac{-g\Delta G}{2(t + w)} \quad (3)$$

here $g$ = gravitational constant = 980.7 cm $sec^{-2}$ $\Delta G$ = change in apparent weight of "plate" relative to weight in water without a monolayer $w$ = width of plate = 3.0 cm $t$ = thickness of plate = 0.005 cm For our system, the constants can be lumped together to give Equation 4:

$$\pi = -163.16\ (\Delta G)\text{mN M}^{-1} \quad (4)$$

Figure 8:
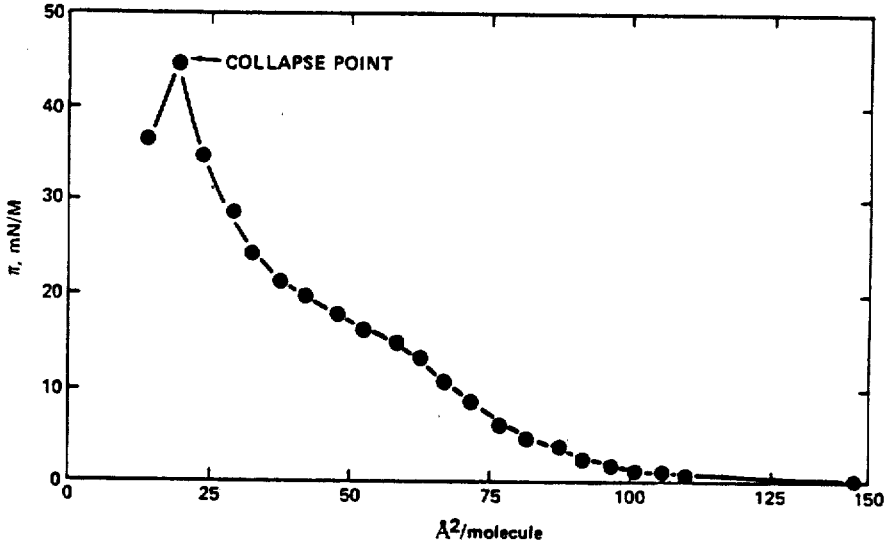
FIG. 8 is a pressure-area curve for arachidic acid at 23.3° C.

The validities of our measured values for surface pressure and area were checked by reproducing the well-known curve for arachidic acid. (See FIG. 8).

B. Blodgett-Kuhn Dipping Trough

A dipping trough was constructed so that the water or salt hypophase (liquid supporting the monolayer) and any monomolecular film spread upon it are in contact only with thoroughly cleaned Teflon or Pyrex glass. The windlass is machined to move clamped membranes smoothly up and down during deposition, and is hand-controlled for individual monitoring of each trip.

The polyethylene float confirming the spread monolayer is free to move forward within the confines of parallel Teflon bars. Its position at a given moment reflects a balance between the surface pressure of the spread film and the force exerted by an aluminum weight that hangs freely from the front of the apparatus and is attached to the float by a nylon thread. This apparatus is enclosed by a protective Lucite box. In shakedown runs, arachidic acid multilayers were deposited on glass slides, for comparison with literature reports.

C. Contact-Angle Apparatus

A highly sophisticated contact-angle goniometer (Ramè-Hart, Inc., Model 100-00) was modified and refined from a design originated at the Naval Research Laboratories. A microsyringe is used to deliver calibrated drops of liquid to the surface being evaluated. The apparatus is mounted on the trunnions of a tilting base so that the alignment of optics and specimen is held constant during measurement of advancing and receding angles. Special film clamps are used to secure membrane strips flat on the specimen stage. The entire apparatus is enclosed in a protective Lucite box.

D. The Laboratory Stack for Fouling Evaluations

1. Stack construction a. The separators

Three-inch square separators were designed to hold twelve membranes rigid in each electrodialysis cell. They were built individually on wooden frames, with Lucite side pieces and evenly spaced Tygon "spaghetti" tubing potted into Silastic cement serving as end pieces. After the Silastic cured, the separators were removed from the frames, and the Tygon tubes were severed at the inside surfaces of the end pieces. Their other ends were potted into large-diameter acrylic tubes for attachment to the hydraulic system. Entry and exit of salt solutions through the resulting multiple ports ensured thorough, well-distributed flushing of all membrane surfaces, with a good approximation to laminar flow.

b. The hydraulic circuit

Figure 5:
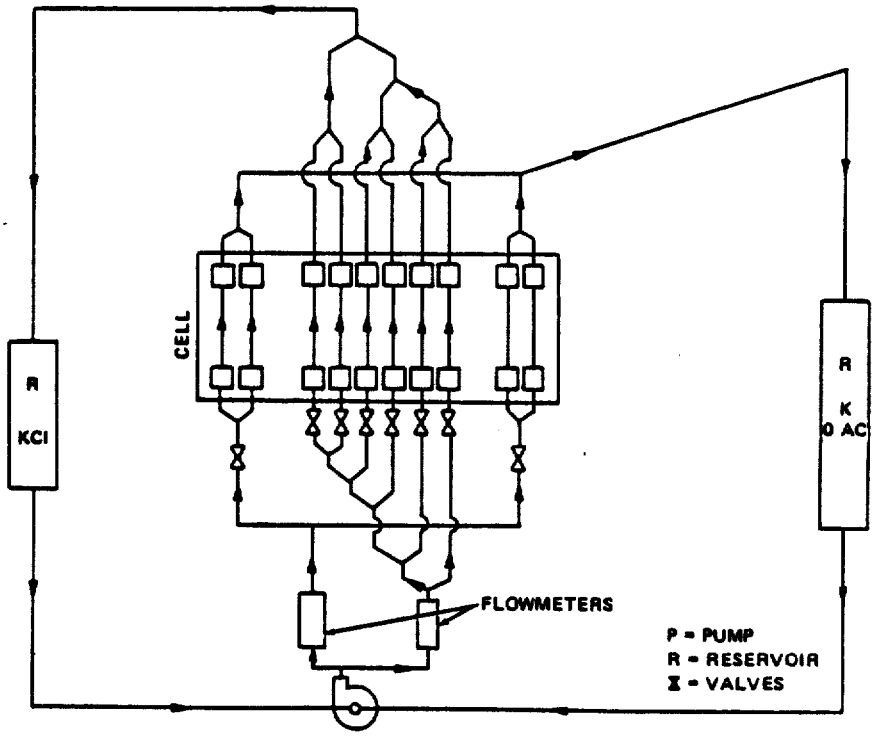
FIG. 5 is a schematic representation of the hydraulic circuit for fouling evaluations.

As FIG. 5 illustrates, streams of solution circulate from separate reservoirs through the electrodialysis cell. Potassium chloride is the electrolyte of choice in the test compartments, potassium acetate (KOAC) is the electrolyte for the electrode compartments. A Cole-Parmer Model WZ1R057 Masterflex pump with one add-on head drives both solutions through silicone rubber tubing at flow rates up to 2 L/min. The valves of the system are adjusted during operation to equalize the flow between test compartments and electrode compartments.

c. The electrical circuits

Figure 6:
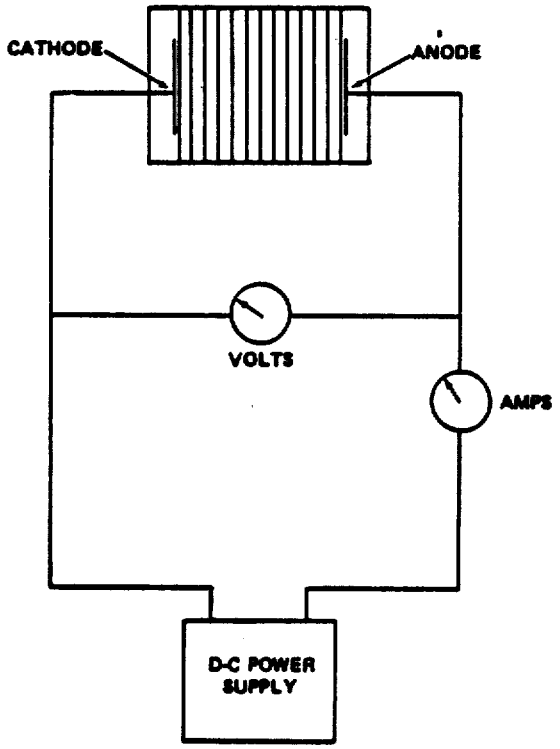
FIG. 6 is a representation of the electrical circuit for the fouling evaluation stack.

An Epsco Model D-612T power supply establishes selected potentials between a platinized-titanium anode and a stainless-steel cathode, which are sealed into the two Micarta end blocks that forms the ends of the electrodialysis cell. Although the power supply has readouts for both voltage and amperage, a milliammeter and a voltmeter were included in the circuit for additional precision (FIG. 6).

d. Stack assembly

Figure 7:
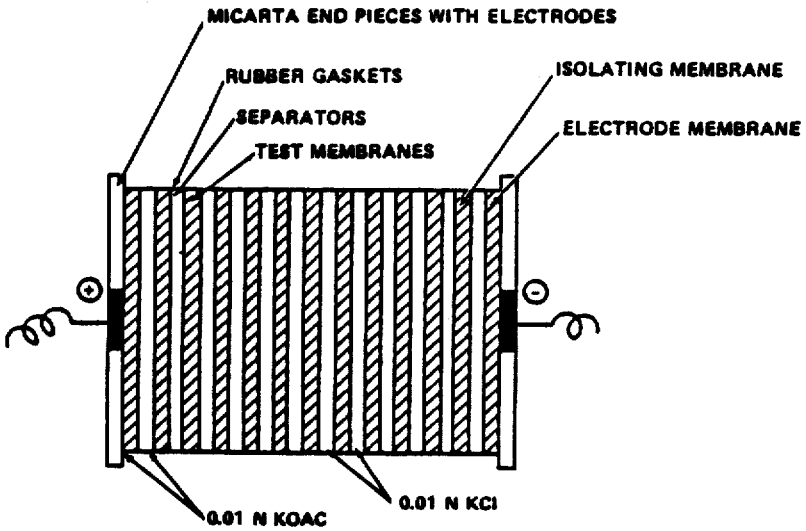
FIG. 7 is a schematic diagram of the assembled test electrodialysis cell.

The cell is clamped together as diagrammed in FIG. 7.

e. Shakedown fouling runs

The fouling test stack was assembled with eight test membranes in the central positions, treated sides facing the cathode. Untreated AMF A-63 anion-exchange membranes were used as electrode membranes and as isolating membranes between the KCl and KOAc streams.

Potassium acetate (KOAc) was selected as the electrolyte for the electrode compartments to prevent chlorine evolution, which might obscure or otherwise interfere with the fouling process. Potassium chloride (KCl) was used as the electrolyte in the test compartments because potassium and chloride ions have approximately equal transference numbers (0.50) in aqueous solution. The test solution also contained 0.1% of sodium humate (Aldrich Chemical Company, Milwaukee, Wisc.), which makes it more concentrated than natural waters by a factor of about $10^4$.

All test membranes and isolating membranes were equilibrated in KCl solution prior to insertion in the cell, and the two electrode-compartment membranes were equilibrated in KOAc. They were arranged in the cell in order, with Sample 1 in the cathode compartment, Number 2 isolating the cathode compartment from the test compartment, Numbers 3 through 6 in the test compartments, Number 7 separating the anode and test compartments, and Number 8 in the anode compartment (see FIG. 7). In cases where the test membranes were coated on only one side, the treated side faced the cathode. Three 13.5-mil gaskets between the membranes and separators have good sealing with free solution flow.

IV. EXPERIMENTAL DETAILS

A. Chemicals

1. Chemicals for fouling tests

Sodium humate (technical grade) was purchased from Aldrich Chemical Co., Milwaukee, Wisc.

2. Chemicals for Blodgett deposition

Samples of surface-active compounds bearing perfluorinated carbons at the end of their chains opposite to various functional groups were furnished by the Commercial Chemicals Division/3M Center, St. Paul, Minn. These compounds are laboratory prototypes, and 3M policy precludes revealing their molecular weights or any information other than that shown in Table I, below.

Other fluorinated, non-fluorinated and polymerizable compounds were purchased from commercial suppliers. Although it is not certain that all of these are sufficiently surface-active to properly undergo oriented deposition, fluorinated molecules are usually surface active at a much lower molecular weight or shorter chain length than their hydrogenated homologues.

TABLE I

CHEMICALS FOR BLODGETT DEPOSITION

| Compound Name or Formula | Source | Molecular Weight | Catalog No. |
|---|---|---|---|
| Fluorinated Compounds | | | |
| $R_f$—COOH | 3M | | L-1058 |
| $R_f$—$SO_2K^+$ | 3M | | L-1159 |
| $R_f$NHMe | 3M | | L-2338 |
| $R_f$—PO $(OH)_2$ | 3M | | L-4317 |
| 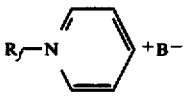 | 3M | | L-4745 |
| Hexadecalfluoro-1-nonanol | Gallard-Schlesinger | 432 | F-4530 |
| Perfluorotributylamine | Gallard-Schlesinger | 671 | F-6220 |
| Perfluorodecanoic acid | PCR | 514 | 10614-6 |
| 11-H-Eicosafluoroundecanoic acid | PCR | 546 | 13174-8 |
| Non-fluorinated compounds | | | |
| Cetylpyridinium bromide | Sigma | 384 | C5881 |
| Hexadecyltrimethylammonium bromide | Sigma | 364 | H5882 |
| Dodecyltetramethylammonium bromide | Sigma | 308 | D8638 |
| Tetradecyltrimethylammonium bromide | Sigma | 336 | T4762 |
| Polymerizable monomers | | | |
| Hexafluoroisopropyl methacrylate | Polysciences | 236 | 2401 |
| Hexafluoroispropyl acrylate | Polysciences | 222 | 2400 |

B. Anion-exchange Membranes

1. AMF A-63

The anion-exchange membrane, AMF A-63, is lightly crosslinked polystyrene imbibed into polyethylene film, chlorinated, and quaternized with dimethylethanolamine. Korngold focused most of the experiments in his detailed study of fouling of anionselective membranes on this material, providing extensive data on fouling of A-63 as a function of time, current density, salt concentration, feed solution velocity and buffered pH. Desalination 8 (1972), 195.

A-63 is not commercially available at present, but Dr. Richard N. Smith of Southern Research Institute, Birmingham, Ala., kindly donated a large supply, which he personally prepared while employed by AMF Corporation.

2. SORI A568-007

Kressman and Tye suggested many years ago that membranes exposed to tap water during their manufacture were effectively pre-fouled before any exposure to the colloidal content of natural waters. J. Electrochem. Soc. 116 (1969), 25. Therefore, the critical initiating step that catalyzes fouling had already taken place.

For this reason, and because there was difficulty in evaluating limiting currents to characterize the AMF A-63 membranes, novel, low-resistance anion-exchange membranes were prepared under carefully controlled non-fouling conditions. No water is used during actual preparation, and the membranes were exposed only to reagent-grade chemicals, with solutions in Milli-Q water used for equilibration to saline conditions. Because oils and surfactants are omnipresent on skin, gloves were worn during the handling, and the samples were protected from other sources of contamination.

C. Pressure-Area Curves of Selected Compounds

A fluorinated aromatic heterocyclic bromide

Initially, a 1:1 chloroform-methanol mixture was used as a spreading solvent for $R_f$PyrBr, a fluorinated pyridinium bromide furnished by Dr. Kenneth D. Goebel of the 3M Corporation. This compound is a laboratory prototype, and its molecular weight and precise composition are proprietary. It is believed to be a long hydrocarbon chain which links the pyridinium bromide group with a fluorinated end group.

Because of its compatibility with water, 1:1 chloroform methanol is not an ideal spreading solvent, and thirteen possible alternatives were screened. This study showed that the first attempts at dissolving and spreading $R_f$PyrBr had pinpointed an optimal solvent; in fact, this compound was unable to be dissolved in chloroform-methanol mixtures containing less than 50% methanol. With sufficient care, this system produces reliable monolayers, especially at reduced temperatures, as shown by the $\pi$-A curves in FIG. 9. Because the molecular weight is not known, units of $Å^2/\mu g \times 10^{16}$ were used instead of $Å^2$/molecule for these plots.

The behavior in high pressure ranges described by these curves is very different from that observed for non-fluorinated compounds. Quite ordinary compressibility changes up to a surface pressure of 20 mN $M^{-1}$ were observed. Most monolayers exhibit sharply decreased compressibilities above this pressure, causing the curve to become nearly vertical until the collapse pressure is reached between 30 and 50 mN $M^{-1}$. (See FIG. 8 for arachidic acid). In contrast, $R_f$PyrBr monolayers are highly compressible up to 35 mN $M^{-1}$, with smooth transitions between several compressibility ranges. At 55 mN $M^{-1}$, the film does not collapse, but it exhibits a constant surface pressure. Inducement of collapse in $R_f$PyrBr monolayers was never successful.

A definitive interpretation of this behavior is impossible without knowledge of the area available to each molecule at given surface pressures. Nevertheless, the observed high compressibility at surface pressures above 30 mN $M^{-1}$ would correspond with Gaines' statement that " . . . the fluorinated compounds occupy considerably larger areas in monolayers on water than their hydrocarbon analogs . . . " Insoluble Monolayers at Liquid-Gas Interfaces, Interscience, New York, 1966. There is an impliction that, at least in such an oriented states, strong repulsions exist between the fluorinated molecules. Increases of surface pressure would be utilized in overcoming these repulsions, up to the point where solution in the water hypophase becomes energetically preferable to further compression or collapse. Thus, at 56 mN $M^{-1}$ of surface pressure, $R_f$PyrBr may be dissolving at a rate exactly balanced by the rate of film compression.

Figure 9:
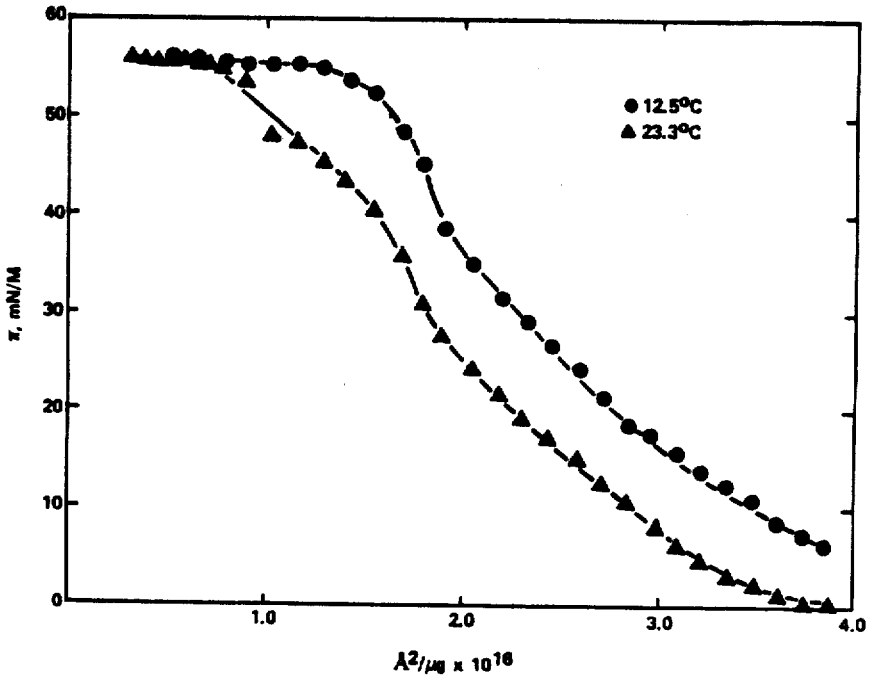
FIG. 9 is a $\pi$-A curve of $R_f$PyrBr.
Figure 10A:
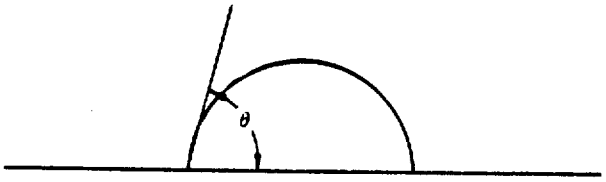
Figure 10B:
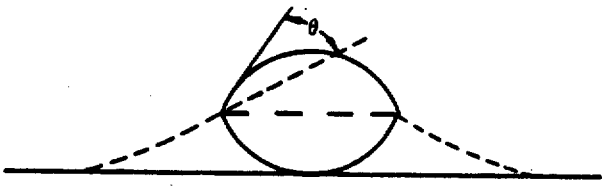
Figure 10C:
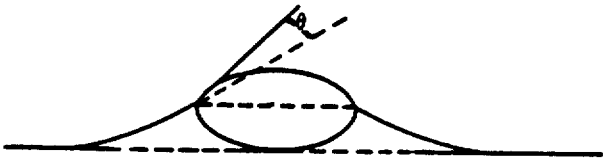
Figure 10D:
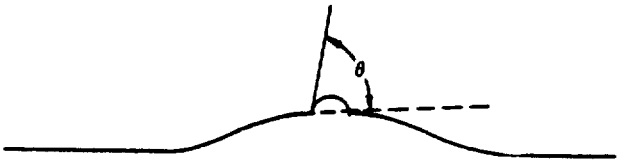

Two facts critical to attaining the objectives of this research emerged from examination of the $\pi$-A plots for $R_f$PyrBr (FIG. 9). First, at 30 mN $M^{-1}$, the highest deposition pressure heretofore used, this film cannot be considered to be highly condensed. For effective film transfer to a substrate, with a transfer ratio close to 1.00 and rigid orientation throughout the film, the monolayer must be compressed quite close to the collapse point.

Second, as suspected, $R_f$PyrBr has a nontrivial solubility in water. It is apparent from the parallel but offset $\pi$-A curves at different temperatures that the solubility is highly temperature dependent. To deposit $R_f$PyrBr films of optimal compactness and coherence, the work must be done at low temperatures and surface pressures of at least 35 mN $M^{-1}$.

D. Multilayer Deposition in the Blodgett-Kuhn Trough

1. Sample preparation a. Membrane cleaning

A procedure was devised to free the surfaces of AMF A-63 anion-exchange membrane from grease, surfactants, and other contaminants. Although it is probable that commercial anion-exchange membranes are somewhat fouled during the manufacturing process itself, samples carefully cleansed of removable materials gave the most reliable baseline for evaluations.

In every step of the cleaning protocol, the operator wore clean gloves, and only Milli-Q water was allowed to contact the membrane samples. Use of this high-purity water, which is extremely low in both salt and organic content, prevented further contamination and reversed, if possible, prior contamination.

The treatment included the following steps: brush-scrub both sides of each membrane with a Milli-Q solution of Oxford Laboratory Cleaner; rinse in hot Milli-Q water; treat overnight with Milli-Q water at 70° C. in an ultrasonic cleaner; dry in an oven at 50° C.; and store in a desiccator.

b. Coding of samples

Completed samples are marked by a hole puncher with a code designating which side is treated, the type of treatment, and the position of the membrane during dipping. It is then possible to differentiate, for example, between the sample that faced the left front of the dipping trough and the one that faced the right rear. Such differences in position may lead to significant variations in properties, as observed by Fort and Lando for multilayered reverse-osmosis membranes. Office of Saline Water Research and Development Progress Report 74-944 (1974).

c. Multilayer preparation (1) Arachidic acid multilayers

Arachidic acid monolayers at 25 mN $M^{-1}$ and 25° C. were spread on Milli-Q water from a $10^{-4}$M chloroform solution. Float movements during membrane dipping cycles were reproducible for clean, flat membranes. Sets of membranes coated with 1, 2, 3 and 10 y-layers (head-to-head, tail-to-tail) of arachidic acid were prepared. These samples provided sufficient material for a fouling-evaluation run as well as for examination of wetting behavior, microscopic surface structure, electrical resistance, and transference number. Immediately after preparation, the samples were immersed in Milli-Q water and stored in water until evaluation.

(2) Fluorinated pyridinium bromide multilayers $R_f$PyrBr proved to be almost insoluble in chloroform, which is a preferred spreading solvent. It was highly soluble in methanol and was spread from a 1:1 methanol-chloroform solution, the highest chloroform concentration in which it would dissolve. This mixture is far too compatible with water to be a good spreading solvent, and the utmost care was required to prevent drops of solution from piercing the water surface and dissolving in the hypophase. Although monolayers were formed, it is probable that the pyridinium bromide was also able to swim out of the bulk hypophase onto the exposed water surface at the back edge of the float. This can create a competitive lowering of the surface tension at that edge, and the force exerted on the enclosed film may be erratic.

Pressure-area curves indicated that a low temperature is desirable to ensure formation of stable films and minimize solution of $R_f$PyrBr. By packing the dipping trough in an ice-brine slurry, its temperature was maintained between 9.0° and 11.5° C. Films were spread from a $10^{-4}$M solution in 1:1 chloroform-methanol.

On the basis of the $\pi$-A curves for $R_f$PyrBr, it was also decided to work at higher surface pressures than those used in the exploratory phase. Sets of membranes were prepared coated with 1, 2, 3, and 10 layers of $R_f$PyrBr, at deposition pressures of 30 mN $M^{-1}$ and 40 mN $M^{-1}$.

The differences in float behavior between the 30-mN $M^{-1}$ and 40-mN $M^{-1}$ dipping runs were striking. At 30 mN $M^{-1}$, float movement (by which the amount of material deposited is measured) was always somewhat erratic during immersion. Although the first several layers of $R_f$PyrBr transferred as x-layers (head-tail-head . . . ), float movement on the third to fifth emersion signalled the deposition of a y-layer (tail-tail-head-head . . . ). Additional y-layers were deposited at random between x-layer sequences on the 10-layer samples. Considerable randomness thus occurred in the multilayer structures deposited at 30 mN $M^{-1}$, although examination by SEM (to be discussed later) portrays a remarkably coherent, frictionless and homogeneous surface.

On initiating $R_f$PyrBr depositions at 40 mN $M^{-1}$, it was decided to "vacuum" remaining monolayer from the hypophase surface between each immersion and emersion. This procedure ensures x-layering throughout the entire structure and eliminates any randomness in the multilayer pattern. All emersions under these conditions produced very clean, smooth minisci at the emerging membrane surfaces. This is a good indicator that the surface is sub-microscopically smooth. Membrane samples dipped singly, so that both sides were coated with pyridinium bromide, swelled and buckled to some extent, but not as severely as similar samples dipped through arachidic acid. The buckling problem was virtually resolved when samples were sealed together for asymmetric coating. All of the asymmetrically coated samples curled toward their coated sides after separation from the sandwiches and drying, implying that the two sides are indeed different.

Through careful monitoring of the behavior of the meniscus at the vertical membrane surface, it was found that maximum deposition was achieved when the rate of dipping was adjusted to ensure a smooth meniscus at all times. For several emersions, maintaining a smooth, intact meniscus required a withdrawal rate as slow at 0.13 cm/min.

Another source of randomness was eliminated by the increase in surface pressure. Float movements on emersion were about 40% larger than at 30 mN $M^{-1}$, and they were very reproducible. Thus, more material was deposited with each layer, and the amount was identical from layer to layer at the higher pressure. Because the molecular weight of $R_f$PyrBr is not known, the surface coverage cannot be estimated. It is probable, however, that by transferring the monolayer films at surface pressures about 30 mN $M^{-1}$, still greater film coherence would be achieved, which should give rise to a distinctive increase in hydrophobicity.

Immediately after preparation, all samples were immersed in Milli-Q water and stored in water until evaluated.

E. Contact Angle Determination

All ion-exchange membranes sorb water, making true measurement of the contact angle displayed by a sessile drop a practical impossibility. Soon after application, the profile of a standing water drop becomes lower while the membrane surface undergoes a simultaneous localized rise. The phenomena responsible for the resulting continuous changes in baseline and profile include at least the following: localized absorption of the water; diffusion of water into surrounding membrane material; and swelling of the polymeric membrane as it sorbs the water. There may also be a degree of actual polymer solution, such as Stamm has documented for wood and other cellulosic materials. Wood Sci. Technol. 3 (1969), 301.

Exploratory measurements showed that all of the present series of membrane samples, treated and untreated, were so hydrophilic that measurement of advancing and receding contact angles was impossible. This corresponds to the experience of Lloyd et al. with sulfonated polysulfone membranes. Annual Report to Office of Water Research and Technology, April 1980. Therefore, it was decided to note initial contact angles and also to follow the change in contact angle as a function of time.

No possibility exists for obtaining an "equilibrium-contact-angle" value in these systems. An "instantaneous contact angle" was obtained as a function of time, anticipating that the slopes of these experimental curves will furnish bases for both comparison and interpretation.

So that a water drop would experience some of the same environment that it would see if the membrane were part of an operating electrodialysis stack, its contact angle has measured on a "damp" sample. This procedure would be more reliable if it were carried out in a chamber with 100% relative humidity, which is possible when an environmental chamber surrounds the contact-angle goniometer.

The sample was removed from Milli-Q storage and briefly patted between paper towels. A standard drop of Milli-Q water was applied from a syringe fixed above the stage of the goniometer. The contact angle was read as quickly as possible, and at regular intervals thereafter.

Changes visible at the drop-membrane junction follow the pattern diagrammed in Steps A through C of FIG. 10. Step A represents the appearance of the system immediately after the water drop is applied. Within 30 seconds, a haze appears at the junction. Later events indicate that the boundary of this haze (represented by a dotted line in FIG. 10) is indeed the surface of the membrane, which is swelling as it sorbs water but is still too "dilute" to appear dark in the telescope.

At Stage C, contact-angle decay has reached a point where an angle is barely measurable, and the drop is virtually completely sorbed. The curved surface of the swelling membrane appears dark in the telescope.

1. Untreated controls

Water drops at the surfaces of untreated AMF A-63 anion-exchange membranes were completely sorbed in about 60 min.

2. Membranes coated with arachidic acid

Three (3) y-layers of arachidic acid, deposited at 25° C. and 25 mN $M^{-1}$, markedly enhanced the sorption process. A standard water drop was sorbed within 36 min.

3. Membranes coated with $R_f$PyrBr

FIGS. 11–13 illustrate the unusual behavior of water drops at the surfaces of membranes treated with $R_f$PyrBr. In every case, the time required for drop disappearance was lengthened beyond the period observed for untreated controls. Furthermore, in the cases of samples covered by three multilayers, the prolongation was roughly proportional to the increase in the surface pressure at which the layers were deposited. These observations are in line with the hypotheses on which the present invention was based.

The slope changes shown in FIGS. 11–13 have been observed with membranes modified by $R_f$PyrBr. They do not, in one sense, represent the actual progress of the wetting process, which was schematically illustrated in FIG. 10, A through D. It is evident that the amount of non-sbsorbed water is greater in 10C than in 10D, but the "apparent contact angle" is larger in 10D. The swelling membrane has reached a plateau, bringing the baseline, to which the contact angle is referred, nearly back to the horizontal. At the same time, it was routinely found necessary to relocate the water drop in the telescope of the contact-angle goniometer. The drop's shift in position is accompanied by an apparent coalescence, which reduces its area of contact with the swollen substrate. The baseline plateau and reduced contact area of the drop both contribute to an abrupt increase in apparent contact angle, and an inflection point on the decay curve.

The wetting behavior of Sample 5 (FIG. 13), which was coated with three x-layers of $R_f$PyrBr at 40 mN $M^{-1}$ and 10.5° C., differed from the other $R_f$PyrBr systems. Sudden decline from an initially high contact angle was followed by stabilization at an angle of about 65°. This can be termed a pseudo steady-state condition because the drop, in reality, underwent several incidents of coordinated baseline and contact area shifts such as described above. Thus, wetting, absorption, and drop disappearance were in fact occurring, but are reflected in FIG. 13 only as small variations around an average steady-state angle. In this instance, interpretation of gross data responses without appreciation of the more subtle evidences of change in the system could lead to serious error.

After a span of 75 min. with only slight decreases in apparent contact angle, the water drop disappeared rapidly into the membrane. This was a single experiment with this type of membrane.

Surprisingly, but in line with the SEM observations, infra, the 10-layer $R_f$PyrBr coating did not lead to further enhanced hydrophobicity (FIG. 13, Sample 6). The SEM of this sample indicated a high degree of disorder, which is consistent with more rapid wetting than observed with the membrane coated by three layers of $R_f$PyrBr.

F. Scanning Electron Microscope Examination

1. Sample preparation

The earliest SEM studies were made on samples that had been imbibed with a glycerol-water mixture, vacuum dried, and sputtered with gold and platinum. The imbibition step was incorporated as a means of keeping pores open, and metallic sputtering ensured sufficient surface conductance to give a clear picture.

It was found, however, that both procedures added experimental artifacts that obscured rather than enhanced the significant characteristics of the modified membrane surfaces. Vacuum drying caused the glycerol mixture to attempt escape, forming blisters and pockets. Sputtering with metals blanketed the much thinner deposited multilayers. If it had been mandatory to sputter to obtain clear micrographs, this disadvantage would have to have been accepted and allow for it in the interpretation. It was found, however, that the membranes themselves have sufficient charge density to yield excellent SEMs, and that sputtering is totally unnecessary. Indeed, the best pictures were obtained when the SEM potential was reduced from 10.0 KV to 2.5 KV.

In the refined sample preparation, Milli-Q water was vacuum dried from the membrane. Vacuum drying itself may be inducing some collapse within the multilayer structure, but this part of the procedure is integral to SEM examination. The micrographs give little or no indication of collapse. This possibility must, however, be kept in mind in comparing these scans with the results of fouling evaluations for membranes that have been kept wet since their preparation.

2. Controls

An untreated sample of AMF A-63 anion-exchange membrane was used as the control. Considerable debris was obvious on the surface, and the surface composition itself appeared to be highly inhomogeneous. No cracks or pores were visible, which was also the case for the samples that were imbibed with glycerol before examining.

G. Tests of ED-Membrane Fouling Propensities

1. Shakedown runs

Several accelerated fouling runs were carried out that lasted from 146 to 186 hours, and others that were terminated after 20 hours. Except in one instance, which can be reasonably explained, the stack reached a steady-state current density before 20 hours had elapsed. No additional information could be obtained by extending the experiments, and all runs were limited to a standard 20-hour period.

Because most of the fouling experiments were carried out before the limiting current of the stack could be evaluated, an arbitrary choice was made of operating potential. It was found that 2.0 volts, the constant potential used throughout these tests, was considerably below the potentials required to produce limiting currents in this system. For ready comparison with large-scale industrial desalination conditions, operating potentials giving rise to 70% of the limiting current would have been preferable. Nevertheless, these runs are valid for demonstrating the effects of different modifications upon fouling-induced resistance increases.

The humate solutions were more concentrated than natural waters by a factor of $10^4$. Therefore, a 20-hour run exposed the membranes to amounts of humic acid many times greater than would ever be encountered during successive normal lifetimes in an electrodialysis stack. Of course, there are many factors in membrane deterioration other than exposure to humates, and service-lifetime studies should be included in future investigations of these membrane modifications.

The first set of shakedown runs was carried out at a constant potential of 2.0 V, linear stream velocities of 0.68 cm/sec, and solution concentrations of 0.001N, with 0.1% (w/w) sodium humate added to the KCl stream. When untreated AMF A-63 control membranes were mounted in the test positions, the operating current densities fell from $17.4\times10^{31\ 3}$ milliamps/cm$^2$ to 11.6 mA/cm$^2$ over the first hour and to $6.8\times10^{-3}$ overnight. For similar periods, the cell containing test membranes coated on one side by three layers of $R_f$PyrBr at 25° C. and 25 mN $M^{-1}$, exhibited currents of $13.6\times10.3^{-3}$, $10.7\times10^{-3}$, and $8.7\times10^{-3}$ mA/cm$^2$. When membranes asymmetrically coated by three layers of arachidic acid were installed, the initial current density, at the constant potential of two volts, were $7.8\times10^{-3}$ mA/cm$^2$ much lower than we observed with the other two membrane types. This indicates that the three (3) arachidic acid layers, with a total thickness of only 60 Å, produced a large resistance increase.

2. Membranes modified by fluorinated pyridinium bromide

Six fouling runs were carried with membranes modified by Blodgett multilayers of $R_f$PryBr. Results are shown below in Table III. Except for two pairs, these membranes were modified under conditions differing in too many variables to yield truly reliable progressions.

TABLE III

FOULING OF AMF A-63 MEMBRANES MODIFIED BY FLUORINATED PYRIDINIUM BROMIDE LAYERS

| Type of treatment | Number of sides treated | Number of layers applied | [a]deposition, dynes/cm | [r]deposition, °C. | Condition at deposition | R. initial, kilo-ohms | [d]R. steady-state kilo-ohms | R. steady-state / R. initial | ΔR. kilo-ohms | Period of test, hours |
|---|---|---|---|---|---|---|---|---|---|---|
| Control | — | — | — | — | — | 17.8 | 45.7 | 2.6 | 27.9 | 17 |
| Control | — | — | — | — | — | 20.0 | 52.6 | 2.6 | 32.6 | 186 |
| $R_f$PyrBr | 1 | 1 | 40 | 10.5 | dry | 14.5 | 17.8 | 1.2 | 3.3 | 183 |
| $R_f$PyrBr | 1 | 2X[b] | 40 | 10.5 | dry | 26.7 | 40.0 | 1.5 | 13.3 | 25 |
| $R_f$PyrBr | 2 | 3X | 35 | 10.5 | dry | 26.7 | 40.0 | 1.5 | 13.3 | 146 |
| $R_f$PyrBr[c] | 1 | 3Y[d] | 25 | 25.0 | dry | 22.9 | 35.6 | 1.6 | 12.7 | 20 |
| $R_f$PyrBr | 2 | 3X | 35 | 10.5 | wet | 22.7 | 57.1 | 2.5 | 34.4 | 186 |

TABLE III-continued

FOULING OF AMF A-63 MEMBRANES MODIFIED BY FLUORINATED PYRIDINIUM BROMIDE LAYERS

| Type of treatment | Number of sides treated | Number of layers applied | $\pi$ deposition, dynes/cm | $\tau$ deposition, °C. | Condition at deposition | R. initial, kilo-ohms | [a]R. steady-state kilo-ohms | R. steady-state / R. initial | ΔR. kilo-ohms | Period of test, hours |
|---|---|---|---|---|---|---|---|---|---|---|
| $R_f$PyrBr | 1 | 10X | 40 | 10.5 | dry | 25.0 | 40.0 | 1.6 | 15.0 | 30 |

[a]Total resistance of stack assembly with all test membranes
[b]Blodgett X-multilayers, head-tail-head-tail pattern
[c]This set of membranes has been stored 2 months at room temperature
[d]Blodgett Y-multilayers, head-tail-tail-head-pattern With the exception of one membrane set modified while wet, all $R_f$PyrBr-coated membranes, compared to untreated controls after both types were fouled, exhibited lower resistances. One layer of $R_f$PyrBr, deposited on a dry membrane at 40 dynes/cm and 10.5° C. (the third sample in Table III) had two effects on resistance: it reduced initial membrane resistance by almost 20%, and it reduced the relative resistance rise on fouling to 46% of the increase for untreated controls. The actual resistance change due to fouling was reduced from 30 to 3.3 kilo-ohms. The fouling test samples were always kept wet, affording the modifying layers optimal conditions for retention of the integrity of freshly prepared samples.

By comparison, 2x-layers of $R_f$PyrBr (the fourth sample in Table III) and 3x-layers of $R_f$PyrBr (the fifth sample in Table III), deposited at 40 dynes/cm and 35 dynes/cm, respectively, raised the initial resistance by 33%, but also reduced the resistance rise on fouling to 58% of that experienced by untreated controls. However, the steady-state resistance reading was 81% of the steady-state resistance of untreated membranes, more than twice the steady-state resistance of the sample coated by one monomolecular layer of $R_f$PyrBr.

X-layers were formed on these samples by vacuuming excess $R_f$PyrBr film from the water surface while the dipped membranes, coated by prior layers, were still submerged. Emersion then occurred through a clean surface, and a fresh $R_f$PyrBr film was spread before the next immersion. Each immersion resulted in highly reproducible float movement in the dipping trough, which indicated the transfer of a highly regular film well registered with the substrate. This arrangement of layers is apparently the preferred configuration for $R_f$PyrBr, giving the best multilayer packing.

It is therefore surprising that 3 y-layers of $R_f$PyrBr, deposited at 25° C. and 25 dynes/cm (the seventh sample in Table III) were almost as successful as 1, 2, 3, and 10 x-layers in reducing resistance increases during fouling. It was observed earlier that the $\pi$-A curves of $R_f$PyrBr showed that the film at a surface pressure of 25 dynes/cm is in only a slightly condensed state, which might hinder transfer to a substrate. However, an SEM, at magnification 1000X, of a membrane coated with $R_f$PyrBr at 25 dyne/cm exhibited a distinctive appearance relative to an untreated surface. The SEM makes it obvious that the previously inhomogeneous membrane surface has been covered by a film that is coherent except for pores that can be ascribed to layer collapse during vacuum drying.

A likely explanation of the reduction in resistance, caused by these y-layers lies in the fact that the seventh sample of membranes in Table III had been coated with $R_f$PyrBr two months before the fouling test, and they had been stored at room temperature. Materials deposited in an arrangement different from the preferred pattern have a tendency to rearrange to the preferred pattern over a period of time, while retaining the multilayered configuration. Fort et al. used X-ray diffraction to discern this behavior in aging multilayers of ethyl stearate. J. Polym. Sci. Part A-1 10 (1972), 1061. It is possible that the y-layers originally deposited rearranged to x-layers during the extended interval between preparation and fouling. Their influence on electrical resistance would then be similar to the effect of multilayers originally deposited in the x-pattern.

The seventh test run was the only evaluation during which the test cell experienced a further resistance increase after 20 hours. In that case, the resistance was steady at 57.1 kilo-ohms (the value reported in Table III) for 100 hours or longer and then underwent a rise toward 65 kilo-ohms at 185 hours. This result is interpreted as due to partial coverage of the substrate membrane by poorly attached $R_f$PyrBr monolayers. It was speculated that, on undergoing a 20% change in dimensions as they sorbed water, membranes that were coated while dry might disturb the continuity of the deposited surface layers. If so, attachment of layers to a prewetted membrane would improve the coherence of the coating.

During application of successive monolayers to the water-swollen membranes, it was noted that float movement in the Blodgett-Kuhn trough was extremely erratic. Total movement during one immersion was only a fraction of that undergone during normal dipping of a dry substrate. These observations made both coverage and attachment of the modifying films questionable. The results of the fouling tests confirmed the suspicion that preswollen membranes cannot satisfactorily accept Blodgett layers.

3. Membranes modified by arachidic acid

In all cases of membranes modified by layers of arachidic acid, resistances doubled during the course of fouling-evaluation runs. Furthermore, the initial resistance exhibited by an ED stack containing membrane samples coated with 1, 2, 3 or 10 y-layers were identically twice that of a stack with untreated control membranes. It appears that one layer, although it is only 20 Å thick, is sufficient to provide "pre-fouling" that the addition of more arachidic acid layers does not supplement.

Resistence increases for membranes coated with arachidic acid were considerably greater than for membranes coated by $R_f$PyrBr, and also larger than exhibited by untreated controls. The SEM observations imply that, once fouled by an oriented layer, the membranes gained surface homogeneity that should somewhat reduce their propensity for continued fouling. It is evident, however, that the charge disparity between the oriented layer and the substrate, which Korngold et al. dubbed the "sandwich effect," is of overwhelming importance in determining fouling propensities.

4. Light transmission of fouled membranes

On visual examination of the fouled membranes, no differences in coloration could be detected between their modified and unmodified sides. The unmodified sides, however, displayed a dull patina, whereas the treated sides were glossy. These differences in appearance indicate that humic acids have occluded the untreated sides, but not the treated sides. Humic acid coloration was homogeneous throughout the samples, but was less intense overall in the membranes coated with $R_f$PyrBr. Because, for accelerated fouling tests, the treatment solution contained much more sodium humate than would ever be found in natural waters, significant amounts of humic acid may adhere to the untreated sides of the membranes by concentration-driven adsorption.

Observations confirming this were made on membranes modified by $R_f$PyrBr and by arachidic acid. One membrane of each pair confronted the humate solution with a multilayered surface, while the other confronted it with the untreated surface. For both types of treatment ($R_f$PyrBr and arachidic acid), the membrane with a treated surface facing humates retained much less coloration than its mirror image. The control membranes exhibited about the same humic acid pickup in both positions.

All fouled membranes, treated and untreated, were stained brown, and the depth of color varied with the position of the membranes in the electrodialysis cell. The observations indicate that treatment with $R_f$PyrBr had no effect on the total amount of humates that adhere to the membrane, but that, at least in this case, multilayer coating prevented the humates from being irreversibly adsorbed by the substrate material.

V. SUMMARY OF RESULTS

It is possible to construct negatively charged or positively charged multilayer assemblies on the surfaces of anion-exchange membranes, thereby modifying the surfaces.

These layers, when assembled at optimal temperature and pressure conditions, confer a marked degree of microscopic homogeneity on the surfaces.

The wetting characteristics of the membranes can be altered by addition of oriented multilayers. In the case of layers with a charge opposite to that of the substrate, the sorption time for a standard drop of water is shortened; if the layers are fluorinated and have the same charge as the membrane, the sorption time is prolonged.

Membranes modified by oppositely charged multilayers wet more quickly than untreated controls.

Membranes modified by $R_f$PyrBr layers wet twice as slowly as untreated controls.

There is a correlation, in the case of three layers of fluorinated material with the same charge as the substrate, between the tightness of packing in the layers and the lengthening of the wetting time.

Both types of multilayer treatment raised the Cowan-method limiting current of anion-exchange membranes, relative to $i_{lim}$ of untreated controls.

However, the effects upon power requirements of the membranes when electrolysis was carried out in the operating range (70% $i_{lim}$) of an ultra-clean system were dramatically different. Power requirements for membranes coated by oppositely charged layers were multiplied by 9. Power requirements for membranes coated by fluorinated layers with like charges were multiplied by 3.

The initial resistance of membranes asymmetrically coated by oppositely charged layers was high relative to that of the controls. It became still higher during operation of an electrodialysis system loaded with $10^4$ times a natural level of humates. This behavior implies that the first few molecular layers added to a substrate during fouling have the most drastic effect upon its electrodialytic properties.

The actual resistance increase during fouling tests is much greater for membranes treated by oppositely charged monolayer assemblies than for untreated controls; the percentage increase over the initial value is lower.

Membranes modified by oppositely charged monolayer assemblies sorb more humate color during a fouling run than untreated controls if the outermost layer is nominally polar; they sorb approximately the same amount if the outer layer is nominally nonpolar.

The alterations caused by oppositely charged monolayer assemblies in both wetting and fouling behavior indicate that homogeneity of the surface exerts an influence on these phenomena that is negligible relative to the influences of charge disparity and hydrophobicity.

The examination of pairs of membranes from the fouling stack demonstrates that treatment by multilayering with either similarly or oppositely charged materials interferes with the deposition of humates at a membrane surface.

Judging from visual examination, all of the membranes, including the asymmetrically modified samples, adsorbed significant amounts of humates during the fouling evaluations. Thus, although the modifying layers may have prevented precipitation of partially neutralized humates at the sides of the test samples that faced the cathode, they did not prevent entry of unneutralized colloidal material from the sides facing the anode.

Membranes modified by fluorinated similarly charged monolayers exhibited an electrical resistance prior to humate fouling that is almost the same as the resistance of fouled control samples.

Actual electrical resistance increases for membranes modified by $R_f$PyrBr x-layers were small compared to those of untreated controls; percentage increases of fouled over initial resistance were halved when these layers were present. $R_f$PyrBr X-layers cause membranes to sorb much more humate color during a fouling run than was sorbed by untreated controls.

Treatment with one layer of $R_f$PyrBr at 40 mN $M^{-1}$ and 10.5° C. was the most successful anti-fouling preventive tested, cutting actual resistance increase from 30 to 3.3 kilo-ohms and the ratio of final and initial resistances from 2.6 to 1.2.

Correlation of Results and Theory

The experiments have borne out the hypotheses that even a single deposited oriented monolayer, with a thickness of 20 Å, strikingly modified both the microscopic appearance and the electrical and fouling behaviors of anion-exchange membranes. While the effects upon appearance were similar, the effects upon wetting behavior and resistance changes during accelerated fouling tests were opposite for layers charged like and unlike the substrate membrane. Therefore, surface roughness and inhomogeneity would appear to be minor factors in the fouling process.

A single monolayer of a fluorinated pyridinium bromide cut resistance rises due to fouling by a factor of 9, demonstrating that this modification holds promise of greatly improving the economics of electrodialytic desalination.

VI. REVERSE OSMOSIS MEMBRANES COATED WITH FLUORINATED PYRIDINIUM BROMIDE

Oriented deposition of 1 Blodgett layer of $R_f$PyrBr was used to modify the surfaces of two types of commercial cellulose acetate reverse-osmosis (RO) membranes. The dipping pressure was 40 mN $M^{-1}$, and the temperature of the system was maintained at 10.5° C. One type of substrate membrane was obtained from Hydranautics, Inc., the other from Fluid Systems, Inc.

By the following table, it can be seen that one layer of $R_f$PyrBr reduced the throughput of the Fluid Systems membrane almost to zero, but it had very little effect on the throughput of the Hydranautics sample. It is probable that the high initial flux of the Fluid Systems membrane is due to the cracks that can be detected in its SEM. These cracks, which would also lead to undesirably low salt rejection, were sealed by application of one monolayer of $R_f$PyrBr.

TABLE II

EFFECT OF MONOLAYERING ON THROUGHPUT OF RO MEMBRANES[a]

| Membrane | Modification | Test Period. hours | Throughput. gfd[b] |
|---|---|---|---|
| Hydranautics | None | 16 | 2.71 |
| Hydranautics | 1 layer $R_f$PyrBr | 18 | 2.24 |
| Fluid Systems | None | 10 | 4.29 |
| Fluid Systems | 1 layer $R_f$PyrBr | 19 | 0.06 |

[a]Exposed to 0.1 molar NaCl containing 2 ppm sodium humate at 160 psi, 25° C.
[b]Gal/ft$^2$ · day Thus, monolayering treatment apparently reversed a surface characteristic of the Fluid Systems membrane that would be a source of undesirable operating properties; the monolayer simultaneously reduced transmembrane flux. The Hydranautics membrane, which exhibited no cracks in its unmodified state, experienced only a minor reduction in flux.

Long-term fouling experiments are needed to compare flux reduction by monolayering with flux reduction by foulant buildup. The preliminary observations indicate that a membrane with high salt rejection and reasonable transmembrane flux will retain these properties after monolayering, but will also tend to repel foulants.

What I claim is:

1. A method of modifying a surface of a separatory material comprising the step of depositing on said surface [a] *at least one oriented monomolecular* layer of [a] *an essentially water-insoluble* fluorinated amphiphilic molecule *which is capable of forming an oriented monomolecular layer and* which is oriented such that the fluorinated portion of said molecule extends outwardly from said surface.

2. A method as claimed in claim 1 wherein said molecule is a fluorinated aromatic heterocyclic bromide.

3. A method as claimed in claim 1 wherein said molecule is fluorinated pyridinium bromide.

4. A method as claimed in claim 1 wherein said layer is a monomolecular Langmuir-Blodgett layer.

5. A method as claimed in claim 1 wherein said molecule is neutral in charge.

6. A method as claimed in claim 1 wherein said molecule has the same electrical charge as said membrane surface.

7. A method as claimed in claim 1 wherein said layer of said molecule is deposited on said surface at a deposition pressure ranging from 30 to 35 mN $M^{-1}$.

8. A method as claimed in claim 1 wherein said layer of said molecule is deposited on said surface at a deposition temperature ranging from 1° to 10° C.

9. A method as claimed in claim 1 wherein the molecular weight of said molecule ranges from 350 to 700.

10. A method as claimed in claim 1 wherein said molecule is water-insoluble at a deposition pressure ranging from 30 to 35 mN $M^{-1}$ and a deposition temperature of 1° to 10° C.

11. A method as claimed in claim 1 wherein said separatory material is a semipermeable membrane.

12. A method as claimed in claim 11 wherein said membrane is a liquid-liquid separatory membrane.

13. A method as claimed in claim 11 wherein said membrane is a gas-gas separatory membrane.

14. A method as claimed in claim 1 wherein said separatory material is a resin particle.

15. A method of treating the surfaces of semipermeable membranes which separates a component of a fluid, comprising the steps of:

(a) placing *on the surface of a body of water* a film of molecules of [a] *an essentially water insoluble* fluorinated amphiphilic compound [on the surface of a body of water] *which is capable of forming an oriented monomolecular layer*;

(b) compressing said film into an oriented monomolecular layer; and (c) moving said membrane vertically into and out of said film spread on a water surface a selected number of times whereby said monolayer is transferred onto an exterior surface of said membrane such that the fluorinated portion of said compound is directed toward said fluid.

16. A method as claimed in claim 15 wherein said compound is fluorinated pyridinium bromide.

17. A method of enhancing the selectivity of a selective semipermeable membrane for a component of a mixture introduced to a surface of said membrane, comprising the step of depositing on said surface [an] *at least one* oriented monolayer of [a] *an essentially water insoluble* fluorinated amphiphilic compound *which is capable of forming an oriented monomolecular layer and* which exhibits an affinity for said component.

18. A method as claimed in claim 17 wherein said compound is surface-active.

19. A method of modifying the surface of a semipermeable membrane comprising the step of depositing on said surface [an] *at least one* oriented monolayer of [a] *an essentially water insoluble* fluorinated amphiphilic compound *which is capable of forming an oriented monomolecular layer and* which has the same charge as said surface.

20. An improvement in a semipermeable membrane of the type having a surface in contact with a fluid to be separated, the improvement comprising [a] *an essentially water insoluble* fluorinated amphiphilic compound *capable of forming an oriented monomolecular layer* being deposited on said surface in [an] *at least one* oriented monomolecular Langmuir-Blodgett layer so as to impart non-fouling characteristics to said membrane.

21. An improvement as claimed in claim 20 wherein said compound is fluorinated pyridinium bromide.

22. An improvement as claimed in claim 20 wherein said layer is oriented with the fluorinated portion of said compound directed toward said fluid to be separated.

23. An improvement as claimed in claim 20 wherein said layer is an x-layer of fluorinated pyridinium bromide.

24. A method of preventing the fouling of a semipermeable membrane used for separating dissolved materials from liquids, comprising the step of depositing on the surface of said membrane [an] *at least one* oriented monololecular layer of fluorinated pyridinium bromide prior to the use of said surface in said separating.

25. An improvement in a semipermeable membrane of the type used for separating dissolved materials from liquids, the improvement comprising fluorinated pyridinium bromide being deposited in [an] *at least one* oriented monomolecular layer on the surface of said membrane that is to be in contact with said liquid.

*26. A method of modifying a solid surface of a material comprising the step of depositing on said surface at least one oriented monomolecular layer of an essentially water-insoluble fluorinated amphiphilic compound which is capable of forming an oriented monomolecular layer and which is oriented such that the fluorinated portions of the molecules of said compound extend outwardly from said surface.*

*27. A method as claimed in claim 26 wherein each layer of said fluorinated amphiphilic compound is a monomolecular Langmuir-Blodgett layer.*

*28. A material having improved non-fouling characteristics, said material including a smooth solid surface having thereon at least one oriented monomolecular layer of an essentially water-insoluble fluorinated amphiphilic compound capable of forming an oriented monomolecular layer, said compound imparting improved non-fouling characteristics to said surface.*

*29. A material according to claim 28 wherein said layer is a Langmuir-Blodgett layer.*

*30. A method according to claim 26 wherein said compound is a long chain compound having a fluorinated group and a polar group at opposite ends of said chain, said compound being neutral in charge or having the same charge as that of said surface.*

*31. A method according to claim 26 wherein said surface is hydrophilic.*

*32. A material according to claim 28 wherein said compound is a long chain compound having a fluorinated group and a polar group at opposite ends of said chain, said compound being neutral in charge or having the same charge as that of said surface.*

* * * * *